US006631825B2

(12) United States Patent
Garrant et al.

(10) Patent No.: US 6,631,825 B2
(45) Date of Patent: Oct. 14, 2003

(54) PRODUCT DISPENSER (75) Inventors: Steven S. Garrant, Greenwich, NY (US); Jonathan W. Hedman, Burnt Hills, NY (US); Mark A. Ferguson, Syracuse, NY (US); Jeffrey P. Pirro, Marcellus, NY (US); David A. Furth, Skaneateles, NY (US); Richard H. Chapman, Camillus, NY (US)

(73) Assignee: Eveready Battery Company, Inc., St. Louis, MO (US)

( * ) Notice: Subject to any disclaimer, the term of this patent is extended or adjusted under 35 U.S.C. 154(b) by 13 days.

(21) Appl. No.: 09/837,046

(22) Filed: Apr. 18, 2001

(65) Prior Publication Data

US 2002/0030062 A1 Mar. 14, 2002

Related U.S. Application Data

(63) Continuation-in-part of application No. 09/764,579, filed on Jan. 18, 2001, now Pat. No. 6,488,176, which is a continuation of application No. 09/658,201, filed on Sep. 8, 2000.

(51) Int. Cl.[7] .................................................. G07F 11/00
(52) U.S. Cl. .......................................... 221/79; 221/256
(58) Field of Search ............................... 221/76, 87, 88, 221/79, 268, 232, 272, 256, 255, 238; 206/701, 703, 704

(56) References Cited

U.S. PATENT DOCUMENTS

| 3,394,796 A | 7/1968 | Jensen ........................ 206/42 |
| 3,437,236 A | 4/1969 | Huck ......................... 221/86 |
| 3,633,792 A | 1/1972 | Steigerwald ................ 221/267 |
| 3,897,265 A | 7/1975 | Jaggard ....................... 136/86 |
| 3,995,767 A | 12/1976 | Brindley et al. ............ 221/82 |
| 4,015,708 A | 4/1977 | Kelm ......................... 206/333 |
| 4,209,091 A | 6/1980 | Lieberman .................. 206/333 |
| 4,591,539 A | 5/1986 | Oltman et al. ............... 429/27 |
| 4,649,090 A | 3/1987 | Oltman et al. ............... 429/29 |
| 4,696,402 A | 9/1987 | Harmon et al. ............. 206/602 |
| 4,791,034 A | 12/1988 | Dopp ........................ 429/27 |
| 4,860,890 A | 8/1989 | Cerny et al. ............... 206/333 |
| 4,953,700 A | 9/1990 | DeDino ..................... 206/333 |
| 5,033,616 A | 7/1991 | Wyser ....................... 206/333 |
| 5,117,977 A | 6/1992 | Voroba ...................... 206/333 |
| 5,129,546 A | 7/1992 | Thielmann .................. 221/66 |
| 5,199,565 A | * 4/1993 | Voroba ...................... 206/704 |

(List continued on next page.)

FOREIGN PATENT DOCUMENTS

GB  2071618  11/1983  ......... B65D/83/04

Primary Examiner—Kenneth W. Noland
(74) Attorney, Agent, or Firm—Linda Gebauer; Russell H. Toye, Jr.

(57) ABSTRACT

A product dispenser comprising a cover, a slidable push element, a base and a landing is provided. The cover and the base are rotatable with respect to each other about a common axis. The cover comprises a roof opening in which the push element slides in opposing directions, advancing product from the interior of the cover onto the landing. In a preferred embodiment, the dispenser houses miniature zinc air batteries, secured to the base using an adhesive layer. When a cell is advanced from the interior of the cover onto the landing, the cell is separated from the adhesive layer, allowing air to pass into the cell and the cell to be activated. The landing preferably comprises a magnet for releasably securing product. The dispenser is then used as an inserter for orienting and placing the product in position in a device. The product is not directly handled during its removal from the dispenser or during its insertion into a device. In the case of a zinc air cell, the cell is untabbed without any direct handling of tab material by the user, and the material functioning as a tab stays with the dispenser upon separation from the cell.

22 Claims, 7 Drawing Sheets

U.S. PATENT DOCUMENTS

| | | | |
|---|---|---|---|
| 5,203,455 A | 4/1993 | Hewelt et al. | 206/333 |
| 5,308,711 A | 5/1994 | Passaniti et al. | 429/29 |
| 5,404,105 A | 4/1995 | Chari | 324/426 |
| 5,477,981 A | 12/1995 | Heyl et al. | 221/86 |
| 5,647,507 A | 7/1997 | Kasper | 221/151 |
| 5,795,667 A | 8/1998 | McKenzie et al. | 429/27 |
| 5,804,327 A | 9/1998 | Oltman | 429/27 |
| 5,839,583 A | 11/1998 | Pope et al. | 206/704 |
| 6,039,185 A | 3/2000 | Pedracine et al. | 206/704 |
| 6,164,490 A | 12/2000 | Bishop et al. | 221/197 |

\* cited by examiner

PRODUCT DISPENSER

CROSS REFERENCE TO RELATED APPLICATIONS

This application is a continuation in part of and claims priority to application Ser. No. 09/764,579 filed Jan. 18, 2001 now Patent Publication No. 6488176/10020060224, which is a continuation in part of application Ser. No. 09/658,201 filed Sep. 8, 2000.

BACKGROUND OF THE INVENTION

The present invention relates to a dispenser for housing and dispensing product, such as miniature batteries including zinc air cells used in hearing aids. As used herein, "battery" means one or more cells.

Handling of miniature batteries is difficult because of their small size. Handling of miniature batteries is typically required in order to remove the batteries from their packaging, to insert the batteries in the proper orientation into a device, and, in the case of air cells, to remove any individual tabbing associated with the cell prior to use. Tabbing is normally associated with metal air cells such as zinc air cells, to limit the ingress of oxygen into the cell until such time as the cell is placed into service. The tab also functions to limit the transport of water vapor in or out of the cell and limits the ingress of carbon dioxide into the cell. Typically, the tab comprises an adhesive material covering one or more air ports. Upon removal of the tab, the ports are exposed to the oxygen of the ambient environment, thereby enabling the cell to be activated. The challenge of handling miniature batteries is exacerbated in the event the user suffers from reduced dexterity, poor vision or other physical infirmity.

Efforts to address some of these issues are found in the art. For example, U.S. Pat. No. 6,039,185 discloses a device for inserting a hearing aid battery into a hearing aid. The device comprises so-called "petals" with an air cell residing on each petal. The cells are individually tabbed, and each tab is then adhered to the petal. The cell is inserted into the hearing aid by gripping the inserter and bringing the appropriate petal up close to the hearing aid battery door to enable the cell to be engaged within the door. The cell is then separated from the inserter using a wiping motion, purportedly leaving the tab adhered to the petal. The method of separating the cell from its associated tab and the inserter as disclosed in the '185 patent places stresses on the hearing aid device, presenting the potential for damage to the device.

Typical packaging for miniature zinc air cells presents further problems. Common packaging for miniature zinc air cells is disclosed for example in U.S. Pat. No. 4,593,700. The packaging disclosed therein consists of a thermoformed or molded blister rotatably attached to a paperboard card. The blister comprises multiple compartments each containing a battery. A battery is dispensed from the package by rotating the blister to align a loaded compartment with a trap door accessible in the back of the card. The trap door can come open during transport and batteries will fall out. The trap door becomes weak and ineffective after multiple uses. The base of the dial can also separate or pull away from the card allowing batteries to fall out. Finally, the consumer must still handle the battery to remove the tab, properly orient the cell in connection with the device terminals and insert the cell into the device once the battery has been removed from the package.

Some consumers use a separate tool to assist them in loading miniature batteries into devices. This tool consists of a magnet on the end of a wand. The tool can be easily misplaced and provides little aid in removing the individual tabbing associated with common zinc air cells.

Handling of other small products including but not limited to pharmaceuticals such as pills, foodstuff such as candy, hardware such as screws, and the like can be equally difficult because of their size, particularly for those users suffering from reduced dexterity, poor vision or other physical infirmity. While the within invention is illustrated in connection with miniature cells, and in particular in connection with miniature zinc air cells, it will be appreciated that the within invention can also be utilized in connection with the transport, storage and dispensing of such other small products. As used herein, the term "product" is not limited to miniature cells or batteries, and fully comprehends such other small products as those identified above.

It is therefore a first object of the present invention to provide a product dispenser that acts as both a structural package for housing and transporting product and a dispenser for removing product from the package and an inserter for manipulating and orienting product into a device or other end use location.

It is also an object of the present invention to provide a product dispenser that removes any direct handling of product prior to its insertion into a device or other end use location.

It is a further object of the present invention to provide a product dispenser that obviates the need for direct handling of tab material in the case of a metal air cell such as a zinc air cell.

It is a further object of the present invention to provide a product dispenser that both activates and dispenses air cells such that the user does not have to handle the cells either before or after insertion into a device.

Another object of the present invention is to provide a product dispenser that eliminates the need for additional tools to handle and orient product for insertion or placement for end use.

Another object of the present invention is to provide a product dispenser that avoids unintended dispensing from the dispenser.

Another object of the present invention is to provide a refill base cartridge for a product dispenser.

Another object of the present invention is to provide a product dispenser that optionally allows the user to attach a refill base after removal of a spent base cartridge.

Another object of the present invention is to provide a product dispenser that allows the consumer to store used product for disposal or material recovery purposes.

The foregoing and additional objects of this invention will become fully apparent from the following description and the accompanying drawings.

SUMMARY OF THE INVENTION

The present invention provides for a product dispenser that is easy to use for storing and dispensing product, such as miniature batteries. The dispenser of the within invention obviates the need to handle the product at any point during the dispensing process or during the insertion or placement process of the product for its end use. To achieve this and other advantages, and in accordance with the purposes of the present invention as embodied and described herein, the present invention provides for a product dispenser comprising a cover and a base, each rotatable with respect to the other about a common axis, a retractable push element slidably engaged along an opening in the roof of the cover, and a landing. The cover further comprises a wall and a wall opening. The roof opening, wall opening and landing are aligned to enable product to be advanced from the interior of the cover, through the wall opening and onto the landing by the push element. The landing is designed to accept and removably retain individual product. The push element slides in opposing directions along the roof opening to engage product and advance product from the interior of the cover onto the landing. The base cooperates with the cover assembly to house the product and provides locations for securing product prior to dispensing.

In another embodiment, the cover is removably attached to the base allowing the base to be disposed of and a replacement base with additional product to be joined with the cover.

In another embodiment the bottom side of the base comprises a storage area for storing used product for disposal or material recovery purposes. The entire dispenser could be processed for material recovery or otherwise recycled. In the event the cover and the base are separable, the base alone could be processed for material recovery or otherwise recycled.

In another embodiment the cover is made of see-through material and the push element or base or both can be color coded to indicate various product characteristics, such as size.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

The specific embodiments illustrated in the appended drawings and described in the following specification are simply exemplary embodiments of the inventive concept defined in the appended claims. Hence, specific dimensions and physical characteristics relating to specific embodiments disclosed herein are not to be considered as limiting, unless the claims expressly state otherwise.

Figure 1:
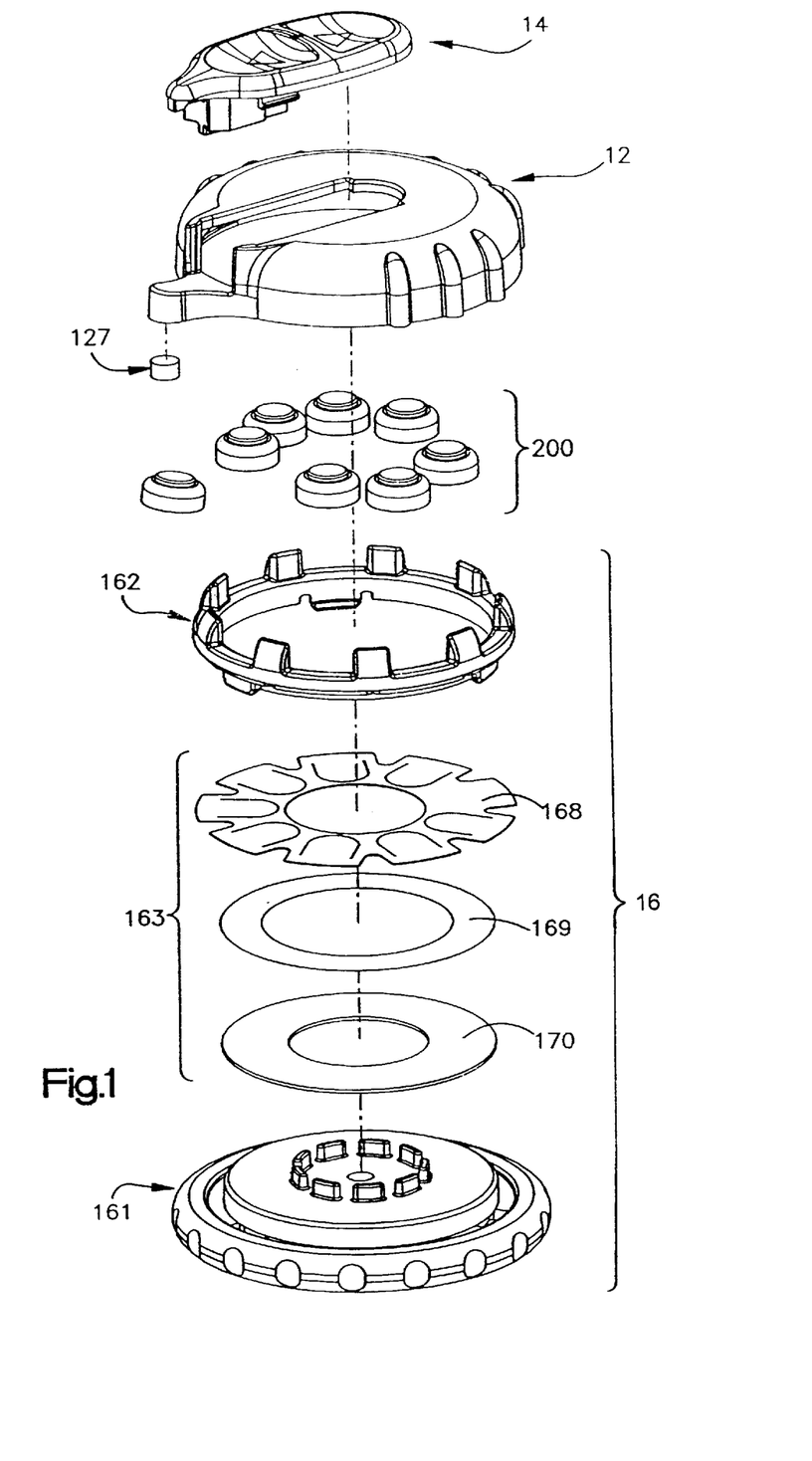
FIG. 1 is an exploded view of a product dispenser according to the within invention.
Figure 7:
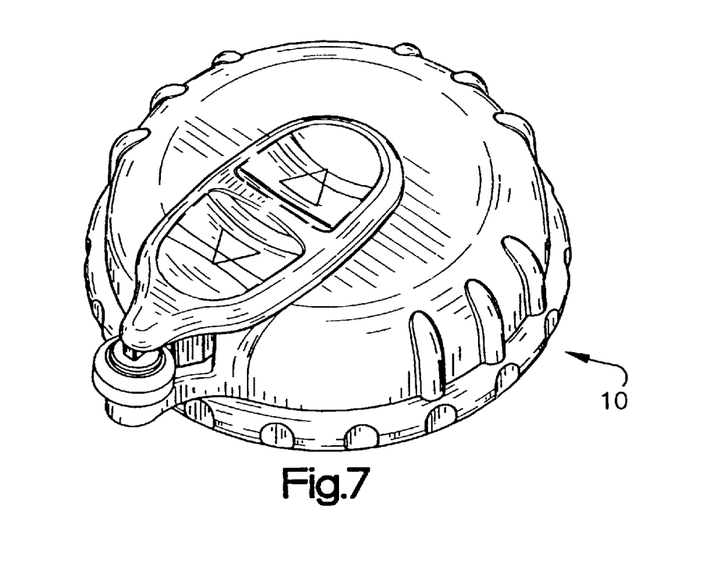
FIG. 7 is a view of a product dispenser according to the within invention.
Figure 8A:
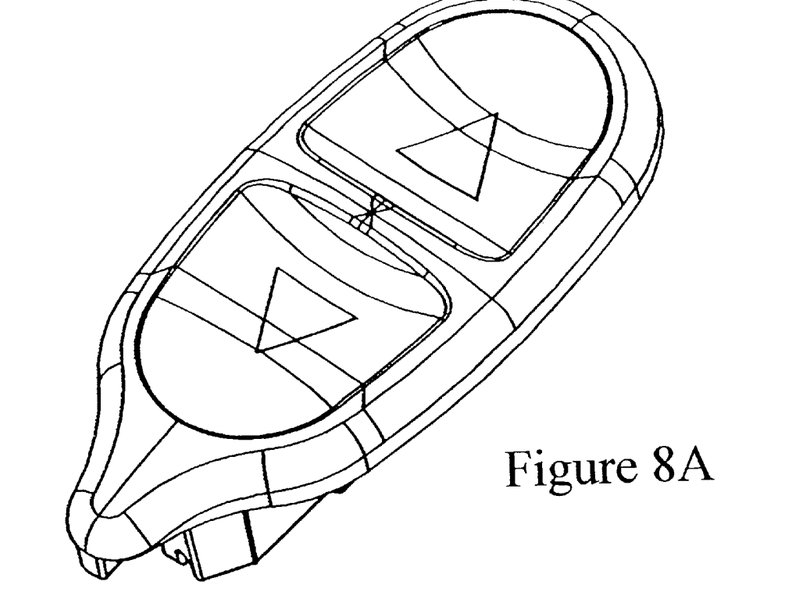
FIG. 8A is a view of an alternate embodiment of the push element of a product dispenser according to the within invention.
Figure 8B:
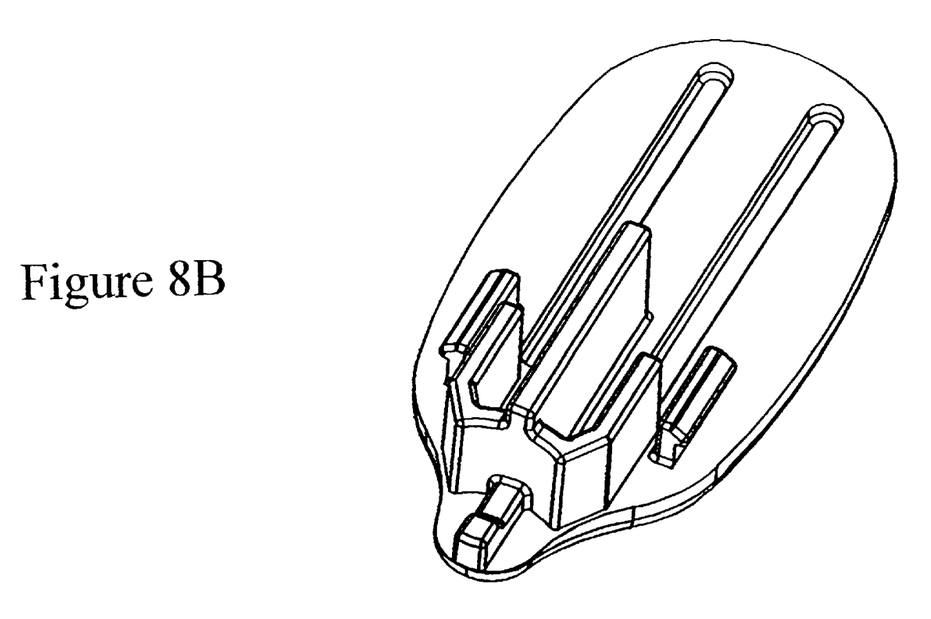
FIG. 8B is another view of the push element of FIG. 8A.
Figure 9A:
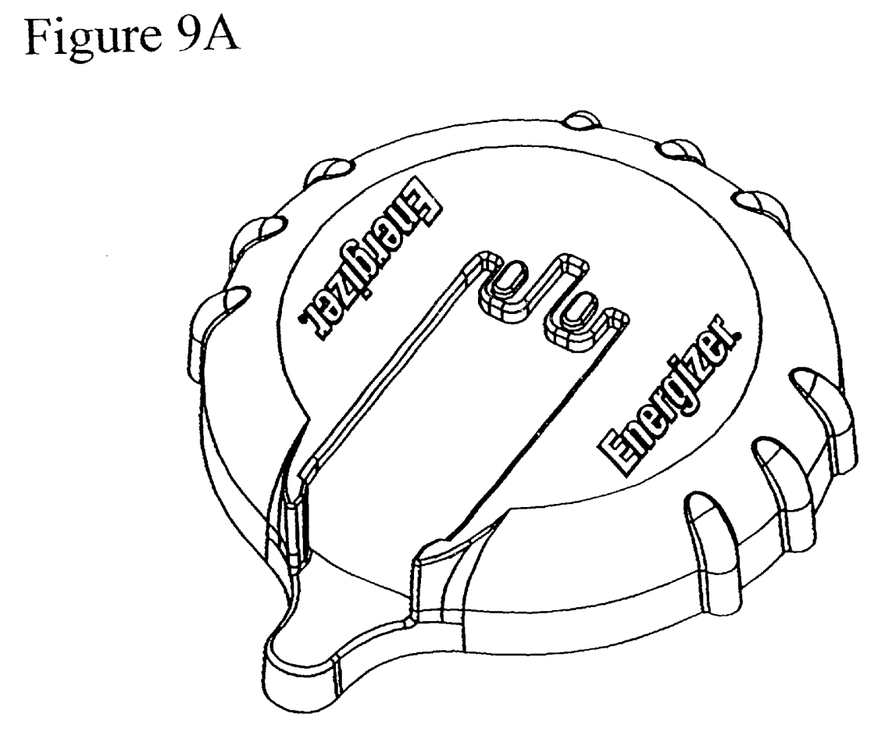
FIG. 9A is a view of an alternate embodiment of the cover of a product dispenser according to the within invention.
Figure 9B:
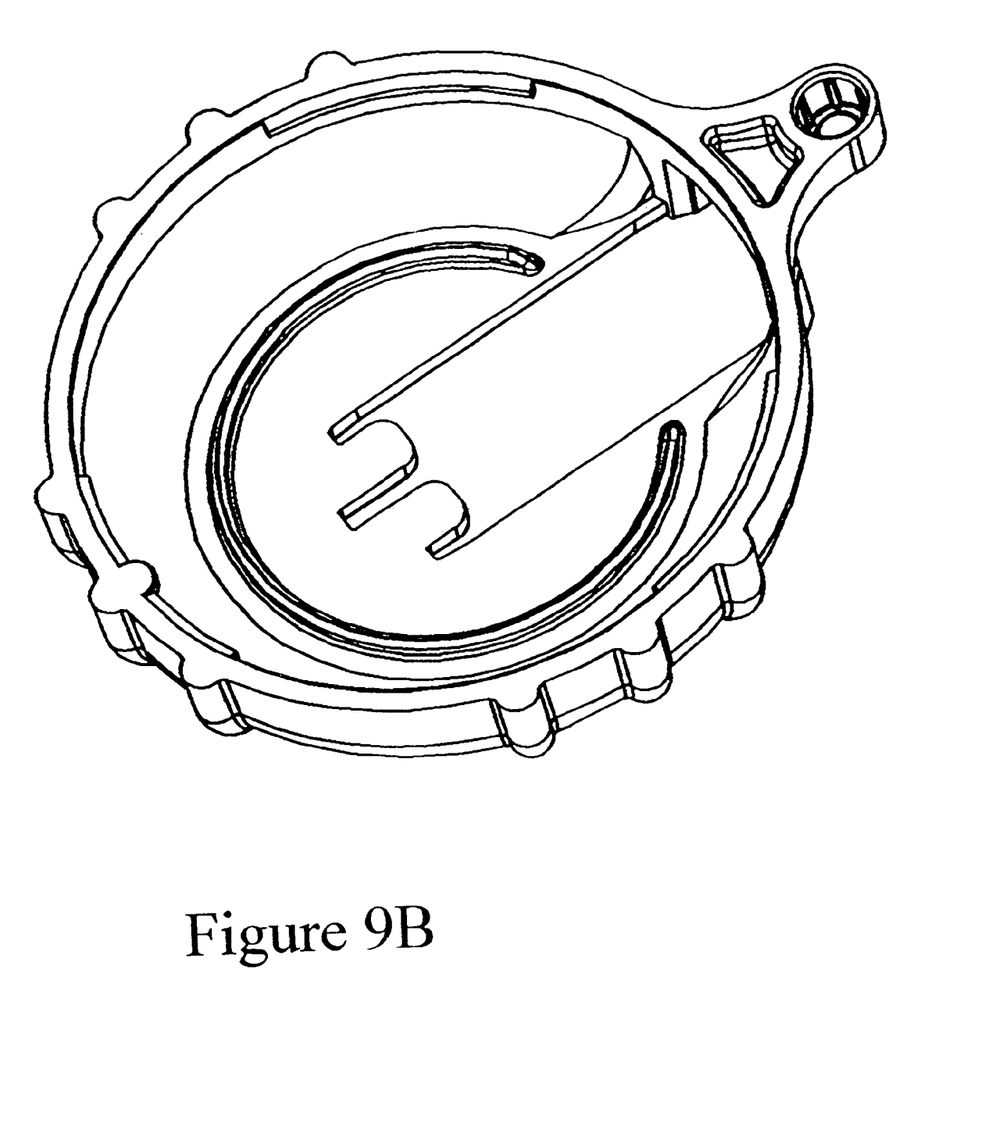
FIG. 9B is another view of the cover of FIG. 9A.

The dispenser 10 of the within invention comprises a cover 12, a retractable push element 14 and a base 16. The cover 12 and the base 16 are connected such that each can be rotated about a common axis with respect to the other. That is, the cover can be rotated while maintaining the base in a stationary position, or, conversely, the base can be rotated while maintaining the cover in a stationary position.

Figure 2A:
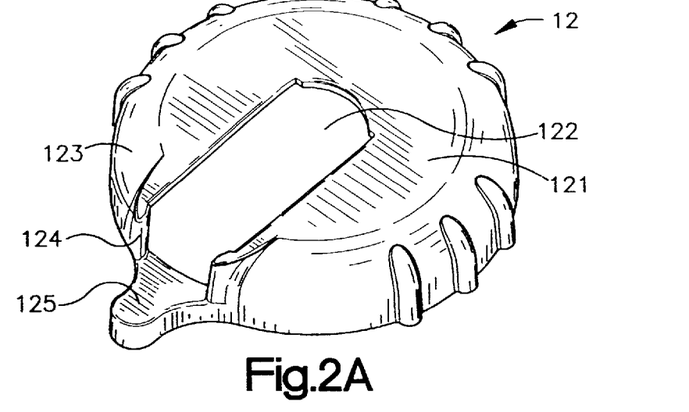
FIG. 2A is a view of a cover of a product dispenser according to the within invention.
Figure 2B:
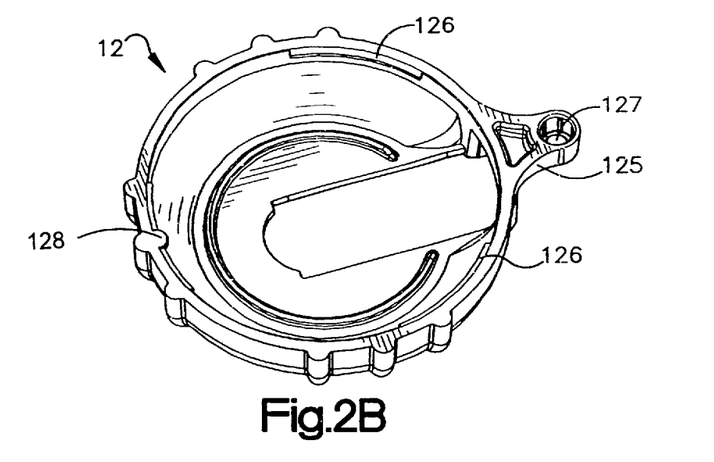
FIG. 2B is another view of the cover of FIG. 2A.

The rotatable cover 12 comprises a roof 121, a roof opening 122, a wall 123, a wall opening 124, a landing 125 and cover snap hook connectors 126. The cover 12 can be made from a readily-available, polycarbonate-based material such as Lexan® 143R resin manufactured by GE Plastics and available from Polymerland Service Center, Pittsburgh, Pa. 15264. It should be appreciated that other durable materials may be used in producing the cover 12.

The roof opening 122 is coincidental with the wall opening 124 and the landing 125 is secured to the cover 12 at a location adjacent to the wall opening 124. Product passes through the wall opening 124 from the interior of the cover 12 onto the landing 125. Product aligned at the wall opening 124 for such transition is said to be located in the product dispensing position.

The landing 125 is preferably inclined as shown to further aid in transitioning the product from the interior of the cover 12 to the landing 125. The landing 125 optionally comprises a magnetic component 127 embedded within the landing. Alternatively, the magnet can be secured to the landing surface via a pressure sensitive adhesive or otherwise affixed to the landing, as is known in the art. The magnetic component 127 aids in controlling and removably maintaining metallic products such as miniature batteries on the landing 125. Alternatively, as dictated by the product, other surfaces or materials, such as velcro or adhesives, may be utilized for controlling and removably maintaining products on the landing as will be appreciated by those skilled in the art. These alternate surfaces or materials may comprise the entire landing. Further, the magnetic component 127 can be planar or otherwise shaped. Where product use and placement permit, the landing 125 may further include a stop wall (not shown) at its distal end to further control the forward motion of the product as it transitions from the interior of the cover 12 to the landing 125. It should be appreciated that the landing 125 may be integral to either the cover 12 or the base 16 or may be a separate component connected to either the cover 12 or the base 16.

The snap hook connectors 126 extend inwardly from the inner surface of the cover 12 and are positioned at regular intervals around the interior perimeter of the cover 12. The connectors interact with the base ring 162 during connection of the base ring with the cover as will be more fully explained below and maintain tension contact with the base ring upon completion of the connection process. The number, shape and positioning of the snap hook connectors is a matter of design choice and can be varied without departing from the scope of the within invention.

The outer surface of the cover wall 123 may be all or partially ribbed as illustrated or otherwise textured to provide a grip for the cover 12 during relative motion between the cover 12 and base 16. Additional gripping can be provided by extending the upper surface of the cover 12 outwardly beyond the cover wall 123 at one or more locations.

Figures 5A, 5B:
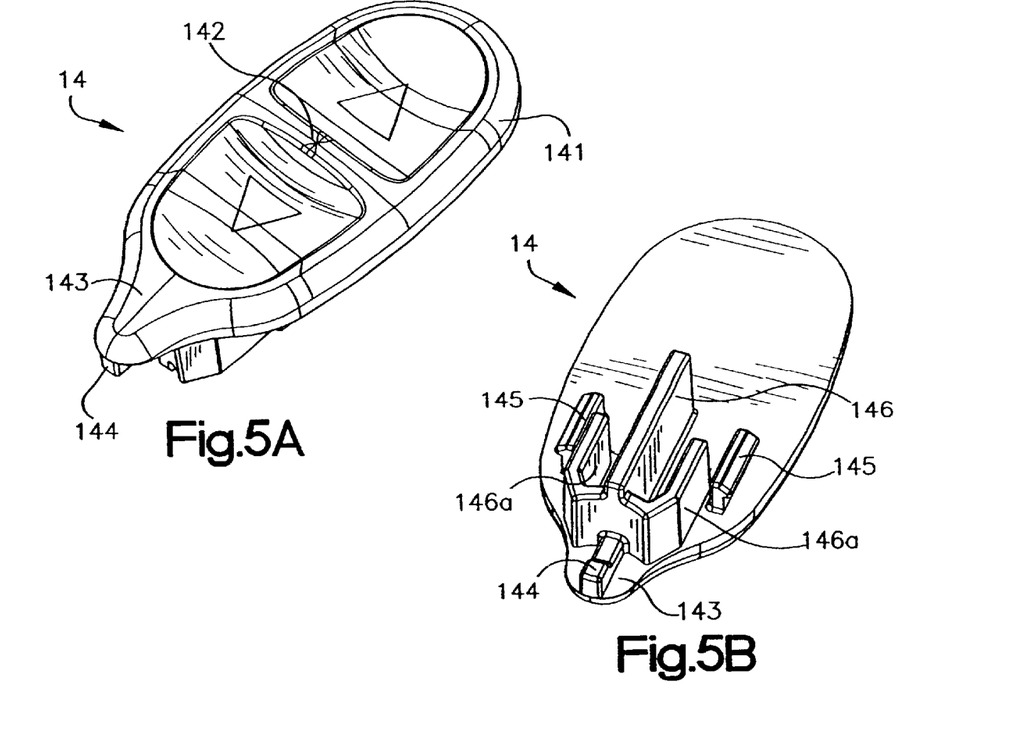
FIG. 5A is a view of a push element of a product dispenser according to the within invention.
FIG. 5B is another view of the push element of FIG. 5A.

The push element 14 comprises a thumbpiece 141 having a gripping rib 142 or alternatively a textured surface secured to the upper surface of the thumbpiece 141 for gripping the push element 14. The push element can be molded from a polystyrene material such as Styron 6075 manufactured by Dow Plastics and available from General Polymers, Columbus, Ohio 43216, or such other suitable material as is known in the art.

The push element 14 further comprises a projection 143. The projection 143 extends over at least a portion of the product located in the product dispensing position during transport and storage of the dispenser 10, to aid in maintaining the product in this position. The projection 143 further aids in controlling the movement of product during transition from the interior of the cover 12 onto the landing 125, and in maintaining the position of individual product on the landing 125. Optionally, a lip 144 is located on the bottom surface of the projection 143 which aids in securing individual product in the product dispensing position and in position on the landing 125.

The push element 14 further comprises two slide rails 145 and a central rudder 146 and two side rudders 146a secured to the lower surface of the thumbpiece 141. When the rudder 146 aligns with a base platform turret opening 167 in the fully retracted position of the push element, the push element 14 can be extended to advance product onto the landing 125. Extension of the push element causes the center rudder 146 to occupy a base platform turret opening 167, preventing rotation of the base 16 with respect to the cover 12. When the push element 14 is fully retracted, the rudder 146 does not occupy a base platform turret opening 167 and the base 16 and the cover 12 are free to move with respect to each other, enabling product to be located in the product dispensing position. Movement of the push element 14 is further controlled by upper projections 172 on base ring 162. When the push element is extended to advance product onto the landing 125, side rudders 146a occupy an opening between upper projections 172, thereby preventing rotation of the cover and base with respect to each other.

The slide rails 145 maintain a snap connection between the push element 14 and the cover 12 and cooperate with the surfaces of the roof opening 122 to allow the push element to move along the roof opening.

It should be appreciated that the projection 143 and the lip 144 may be contoured to shape according to the product contained within the dispenser without departing from the teachings herein.

The slide rails 145 comprise snap hooks to provide a snap connection between the push element and the cover 12 while enabling the push element to slidably extend and retract along the roof opening 122. The slide rails 145 contact the inside surface of the cover wall 123 preventing further extension and defining the fully extended push element position.

Figure 3:
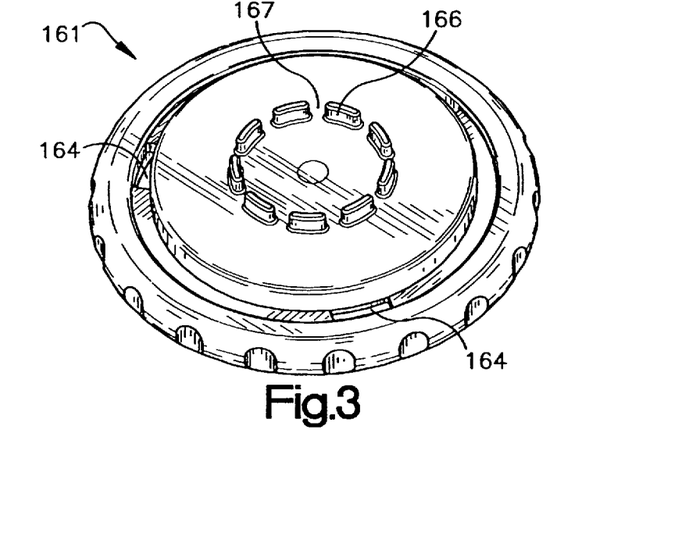
FIG. 3 is a view of a base platform of a product dispenser according to the within invention.
Figure 6A:
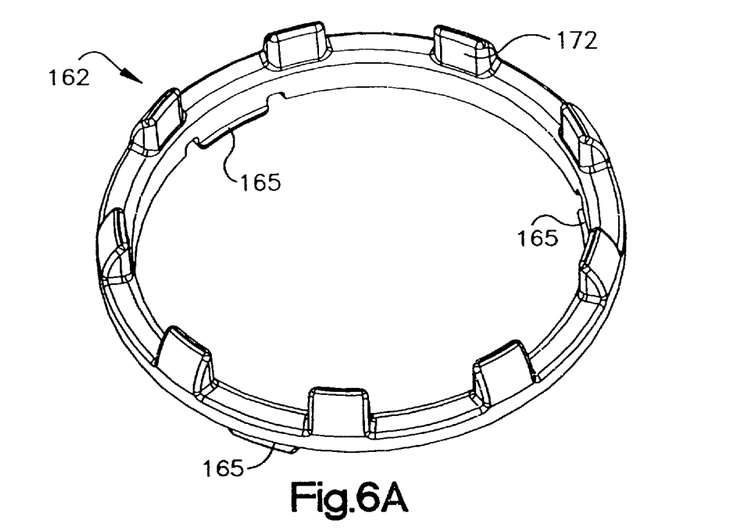
FIG. 6A is a view of the base ring of a product dispenser according to the within invention.
Figure 6B:
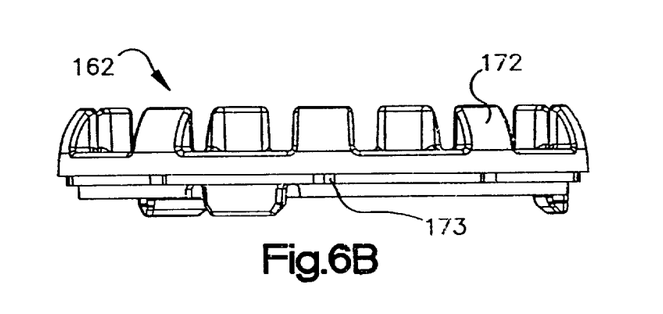
FIG. 6B is another view of the base ring of a product dispenser according to the within invention.

The base 16 comprises a base platform 161, a base ring 162 and a product platform 163. The base platform 161 comprises openings 164 at regularly spaced intervals that cooperate with extensions 165 on the base ring 162 to provide a snap connection between the base platform 161 and the base ring 162. The base platform 161 further comprises turret extensions 166 defining turret openings 167 arranged in a concentric circle, to control the movement of the push element 14 as explained above.

All or a portion of the base platform 161 may be ribbed as shown or otherwise textured to provide a grip for the base 16 during relative motion between the cover 12 and base 16.

Extensions (not shown) from the base may be included to provide handles to aid in separating the base 16 from the cover 12.

Figure 4:
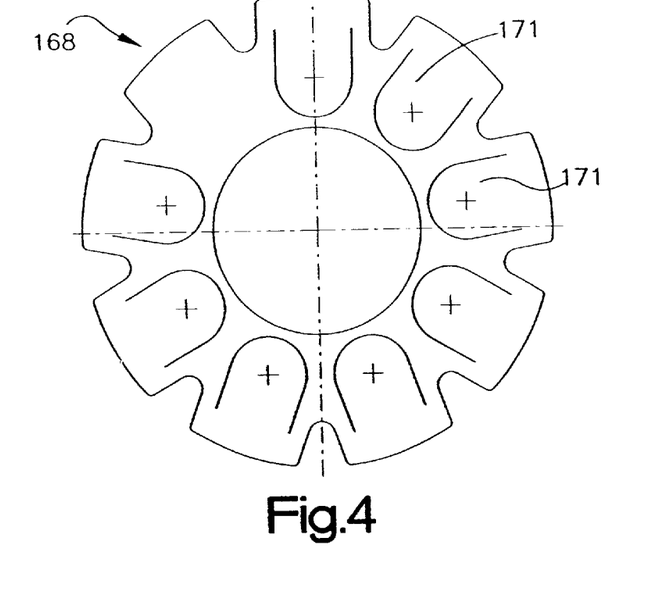
FIG. 4 is a view of one layer of the adhesive product platform of a product dispenser according to the within invention.

Product is fixed onto the product platform 163 via adhesive or other suitable means. In a preferred embodiment of the within invention, zinc air miniature cells 200 are exemplified as the product, and the adhesive product platform comprises an adhesive tab layer 168, a kill liner layer 169 and an adhesive foam layer 17. The tab layer 168 has an adhesive upper surface and comprises precut tab areas 171. Air cells 200 are positioned onto the adhesive surface at the tab areas 171, thereby preventing the ingress of air sufficient to activate the cells prior to dispensing the cells from the dispenser 10. A ill liner layer 169 is positioned between the tab layer 168 and the foam layer 170. The function of the kill liner layer 169 is to selectively block the upper adhesive surface of the foam layer 70 from contacting selected portions of the lower surface of the tab layer 168 and is shaped accordingly. A mylar film suitable for this function can be selected as is known in the art. In this way only a portion of the precut tab areas 171 are adhesively secured to the foam layer 170 prior to dispensing the cell, enabling a measure of control over the amount of force required to separate the cell from the tab as the cell is advanced by the push element from the interior of the dispenser to the dispenser landing. The foam layer and the tab layer are available from Label Technologies, Suwanee, Ga.

In an alternate embodiment, the kill liner layer can be eliminated by selectively applying an adhesive to only those portions of the upper surface of the foam layer 170 where adhesive contact with the lower surface of the tab layer 168 is desired. In another embodiment, selective application of adhesive is accomplished in only those portions of the upper surface of the tab layer 168 where adhesive contact with the product is desired.

The product platform 163 is further joined to the base platform 161 via the snap connection between the base ring 62 and the base platform 161. The base ring 162 comprises a lip about the perimeter to capture tee outer perimeter of the tab layer 168, and lower extensions 165 spaced about the perimeter the cooperate with openings 164 in the base platform to provide a snap connection. The base ring 62 further comprises grooves 173 preferentially corresponding in number to the number of product positions in the dispenser. The grooves 173 cooperate with a boss 128 located on a cover snap hook connector 126 to define a stop position during rotation of the base and cover with respect to each other. The stop position effectively aligns the push element 14 with product in the product dispensing position.

The base ring 162 captures the outer perimeter of the tab layer 168 during assembly of the dispenser, aiding in the separation of the cell from the precut tab areas and in the retention of the precut tab areas with the dispenser as the cell is advanced off of the precut tab areas in transition from the interior of the dispenser to the landing 125.

In this embodiment, the air cells are not individually tabbed with discrete tabs, thereby obviating the expense associated with such an operation. Further, the tabbing material layer remains with the dispenser when the cell is dispensed, avoiding the need to handle or otherwise dispose of an individual tab. It will be appreciated, however, that the dispenser of the within invention can be utilized with individually tabbed air cells. In such an embodiment, the discrete tab is mechanically or adhesively joined to the base. The cell is then separated from the tab when the cell is advanced from the interior of the cover onto the landing while the tab remains attached to the dispenser base.

Other techniques and methods for adhering product to the base may also be used without departing from the teachings of the within invention. Adhesive to secure product may be applied as a surface coating to the upper surface of the base platform 161, or alternatively, may be applied in discrete locations to coincide with the number and spacing of product on the upper surface, thereby obviating the need for discrete adhesive layer 168, kill liner layer 169 and foam adhesive layer 170. Adhesives appropriate to the type of product can be selected as is known in the art.

In another aspect of the within invention, the dispenser can be reused by discarding all or a portion of the base 16 once all of the product has been completely dispensed. A refill kit, comprising fresh product to be dispensed using the dispenser on a replacement base 16 is provided for re-introduction into the dispenser for use with the original cover 12 and push element 14.

In an alternate embodiment of the within invention, additional stability is provided to the push element 14 as it transitions between its fully extended and fully retracted positions by additional grooves 174 positioned on the underside of the push element 14. These grooves 174 cooperate with projections 175 positioned on the cover 12. It will be appreciated that the grooves 174 could alternatively be located on the cover 12 and the projections 175 be located on the push element 14 without departing from the scope of the within invention.

The underside of the base 16 optionally comprises a series of storage compartments (not shown) for spent product. Spent product can be secured in position using an interference fit between the product and the storage compartment. Alternatively, spent product can be secured into position by sealing the compartments with a rotatable covering (not shown) having an opening aligned with an individual storage compartment to allow the spent air cells to pass through the opening into the compartment.

To operate the dispenser from the starting position, the push element 14 is placed in the retracted position. The cover 12 and base 16 are then rotated with respect to each other until product is located in the product dispensing position. The push element is then advanced to the fully extended position, causing the product to transition from the product dispensing position to the landing. At this point, the dispenser 10 may be used as a handle to orient the product and insert it correctly into a device.

The invention claimed is:

1. A method for dispensing products from a container, comprising the following steps:

Providing a dispenser comprising a over, a base and a landing, wherein said cover and base rotate with respect to each other about a common axis;

Providing an opening in the roof of he cover and a push element slidably engaged along the opening;

Providing an opening in the wall of the cover and positioning the landing adjacent the wall opening and outside the cover;

Securing product to the base,

Rotating the base with respect to the cover;

Moving the push element along the roof opening;

Transitioning product from the interior of the dispenser to the landing.

2. The method of claim 1, further comprising the step of adhesively securing product to the base.

3. The method of claim 1, where in the base comprises a basic platform and a product platform.

4. The method of claim 3, further comprising the step of adhesively securing product to the product platform and adhesively securing the product platform to the base platform.

5. The method of claim 4, further comprising the step of providing a landing having a magnetic portion thereof.

6. The method of claim 5, further comprising the step of providing a product that can be removably retained on said magnetic portion of the landing.

7. The method of claim 6, further comprising the step of providing a product comprising zinc air miniature cells.

8. The method of claim 7, further comprising the step of moving the push element in a direction that opposes the rotation direction of the base with respect to the cover.

9. The method of claim 1, further comprising the step of moving the push element in a direction at opposes the rotation direction of the base with respect to the cover.

10. A dispenser for transporting, housing and dispensing product, said dispenser comprising a coy comprising a roof and an opening in said roof, a base, a base ring, a wall, an opening in said wall and a landing, wherein said cover and said base are rotatable with respect to each other about a common axis and said landing extends outside said wall opening.

11. The dispenser of claim 10, further comprising a push element slidably engaged along the of opening.

12. The dispenser of claim 11, wherein said cover further comprises a wall and an opening in said all adjacent the landing.

13. The dispenser of claim 11, wherein said base further comprises a wall and an opening in said wall adjacent the landing.

14. The dispenser of claim 12, wherein said cover wall opening is also adjacent said roof opening.

15. The dispenser of claim 13, wherein said base wall opening is also adjacent said roof opening.

16. The dispenser of claim 14, wherein the push element moves in a direction opposing the rotation direction of the cover with respect to the base.

17. The dispenser of claim 15, wherein the push element moves in a direction opposing the rotation direction of the cover with respect to the base.

18. The dispenser of claim 16, wherein at least a portion of the landing is magnetic.

19. The dispenser of claim 17, wherein at least a portion of the landing is magnetic.

20. The dispenser of claim 18, wherein said base further comprises a product platform and a bas platform.

21. The dispenser of claim 20, wherein said product platform comprises an adhesive layer.

22. The dispenser of claim 20, wherein said product platform comprises adhesive selectively applied to a portion of the product platform.

* * * * *